United States Patent Office 3,455,762
Patented July 15, 1969

---

3,455,762
METHODS OF BONDING SILICONE RUBBERS TO SURFACES
Jack R. Harper, Midland, Mich., assignor to Dow Corning Corporation, Midland, Mich., a corporation of Michigan
No Drawing. Original application Jan. 7, 1963, Ser. No. 249,600, now Patent No. 3,377,309, dated Apr. 9, 1968. Divided and this application Nov. 8, 1967, Ser. No. 681,591
Int. Cl. C09j 5/04
U.S. Cl. 156—315                10 Claims

ABSTRACT OF THE DISCLOSURE

Methods for bonding silicone rubbers to other surfaces employing a special primer composition are disclosed.

---

This invention relates to a composition and methods for bonding room temperature vulcanizing silicone rubbers to other surfaces.

This application is a division of application Ser. No. 249,600, filed Jan. 7, 1963, which is now U.S. Patent 3,377,309.

Since the formulation of the first room temperature vulcanizing silicone rubber, the problem of finding a means of bonding such rubber to other surfaces has existed. Many primers have been formulated for bonding room temperature vulcanizing silicone rubbers to other surfaces but each has had one or more drawbacks. For example, the primers known heretofore required a period of about 3 to 7 days to develop the desired bond strength. Also, such primers gave poor, if any, adhesion to copper.

Applicant has discovered a new primer composition consisting essentially of a phenyl containing siloxane resin, an alkylsilicate, a chlorosilane and a non-halogenated solvent which overcomes the drawbacks of the prior art primers. Applicant's primer composition does not require a long curing period and can be used to give good adhesion of some room temperature vulcanizing silicone rubbers to copper. Furthermore, applicant's primer gives good bonding at temperatures to at least 480° F. whereas with prior primers bonding often failed at temperatures as low as 210° F.

It is the object of this invention to prepare a superior primer for bonding silicone rubber to other surfaces especially for bonding room temperature curing silicone rubber. Other objects will be apparent from the following description.

This invention relates to a primer composition for bonding room temperature vulcanizing silicone rubbers to other surfaces consisting essentially of about 1 to 75 percent by weight of a phenyl-containing siloxane resin, about 0.1 to 10 percent by weight of an alkylsilicate, about 0.01 to 2 percent by weight of a chlorosilane and the balance being a non-halogenated solvent.

A preferred primer composition of this invention consists essentially of 15 to 25 percent by weight of a phenyl-containing siloxane resin which is a copolymer consisting essentially of 25 to 35 mol percent of $(CH_3)_2SiO$ units, 27 to 37 mol percent of $CH_3SiO_{3/2}$ units and 34 to 44 mol percent of $C_6H_5SiO_{3/2}$ units, 1 to 3 percent by weight of ethylorthosilicate, 0.1 to 0.3 percent by weight of methyltrichlorosilane, 10 to 17 percent by weight of toluene and 50 to 75 percent by weight of acetone.

The composition and methods of this invention can be used for bonding room temperature vulcanizing silicone rubbers to steel, aluminum, copper, brass, titanium, plastics, glass, ceramic, masonry, etched Teflon (polytetrafluoroethylene) and the like surfaces.

The surface to which the primer is to be applied must, of course, be clean. That is, the surface should be free of dirt, scales, grease or halogenated solvents. If the surface to be treated is not clean, it must first be thoroughly cleaned and degreased before the application of the primer. Any suitable cleaning agent can be employed. Chlorinated solvents such as perchloroethylene and 1,1,1-trichloroethane are particularly good for this purpose although toluene, acetone, Bon-Ami or some other detergent or cleaning agent could be employed. After the surface has been cleaned, it is necessary to rinse the surface with a non-halogenated solvent if one was not used to clean the surface.

The primer composition can be applied to the cleaned surface by any suitable means. For example, the primer composition can be applied to the surface by brushing, spraying or dipping. The thickness of the primer film applied to the surface is not critical. The length of time which the primer is allowed to dry is not critical either. The drying time, is however, dependent on the solvent used in the primer since solvents vary in the rate at which they evaporate. The drying time may vary anywhere from about 30 seconds to several days. Good adhesion of the room temperature vulcanizing silicone rubbers can even be obtained when they are applied to the primer film several days after it has dried, that is to say, the room temperature vulcanizing rubber does not have to be applied to the primed surface immediately after the primer dries as long as reasonable care is taken to prevent the primed surface from becoming dirty and contaminated.

The phenyl-containing siloxane resin employed in the primer composition of this invention is a copolymer which consists essentially of methyl and phenyl siloxane units and has a phenyl to silicon ratio in the range of .1:1 to 1:1, a methyl to silicon ratio in the range of .6:1 to 1.1:1 and the total of the phenyl and methyl to silicon ratio being in the range of .8:1 to 1.8:1. The methyl and phenylsiloxane units which make up the copolymer are selected from the group consisting of the $CH_3SiO_{3/2}$, $(CH_3)_2SiO$, $(CH_3)(C_6H_5)SiO$, $C_6H_5SiO_{3/2}$ and $$(C_6H_5)_2SiO$$

siloxane units. The resin can also contain some $SiO_2$ units and $R_3Si$ endblocking units, wherein R is methyl or phenyl. Thus, the endblockers can be $(CH_3)_3Si$, $(CH_3)_2(C_6H_5)Si$, $(CH_3)(C_6H_5)_2$ or $(C_6H_5)_3Si$ units. While $SiO_2$ and $R_3Si$ units can be present, it is understood that the specified ratios must be maintained. It is preferred that the phenyl to silicon ratio be in the range of .3:1 to .8:1 and that the total of the phenyl and methyl to silicon ratio be in the range of .9:1 to 1.7:1.

While the amount of the phenyl-containing siloxane resin in the primer composition can vary from 1 to 75 percent, it is preferred that the amount employed be within the range of 10 to 60 percent. As can readily be seen from the examples, the mol percents of the various siloxane units that are present in the copolymer are not critical and can vary over a wide range so long as the above ratios are maintained.

The alkylsilicate employed in the primer composition of this invention can be those of the formulae $Si(OR)_4$ and 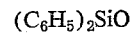 $Si(OR'OR)_4$ in which R is an alkyl radical and R' is an alkylene radical of 2 to 4 carbon atoms. Specific examples of such silicates are ethylorthosilicate, n-propylorthosilicate, ethylpolysilicate, cellosolveorthosilicate, methylpolysilicate, octylsilicate or butylpolysilicate. The term "alkylsilicate" as employed in the specification and claims is intended to include both the ortho and polysilicates. While the amount of alkylsilicate used in the primer composition can vary from 0.1 to 10 percent, the amount is preferably in the range from 0.5 to 5 percent.

The chlorosilanes that can be used in the primer composition of this invention are those having the general formula $R_nSiCl_{4-n}$ wherein R is a hydrocarbon group containing from 1 to 18 inclusive carbon atoms and preferably from 1 to 7 inclusive carbon atoms and $n$ is an integer from 1 to 3 inclusive. R can be, for example, methyl, ethyl, isopropyl, butyl, amyl, hexyl, heptyl, octyl, dodecyl, pentadecyl, octadecyl, vinyl, allyl, phenyl, tolyl, benzyl, naphthyl, xenyl, betaphenylpropyl and styryl groups. Specific examples of the chlorosilanes that can be employed are methyltrichlorosilane, dimethyldichlorosilane, trimethylmonochlorosilane, phenyltrichlorosilane, methylvinyldichlorosilane, methylethyldichlorosilane, ethylheptyldichlorosilane, ethyltrichlorosilane and triethylmonochlorosilane. Methyltrichlorosilane is the preferred chlorosilane. The amount of chlorosilane in the primer can vary from 0.01 to 2 percent, however, it is preferred that the amount employed be within the range of 0.05 to 1 percent. It is also preferred that small amounts of the chlorosilane be employed because of the possible danger of corrosion problems which might occur with larger amounts.

The solvent employed in the primer composition of this invention can be any suitable non-halogenated solvent. For example, the solvent can be toluene, xylene, benzene, naphtha, Skellysolve L solvent (mixed octanes having a distillation range of about 105 to 140° C), methylisobutylketone, acetone, diethylether and mixtures thereof. Any of these solvents can also be used for rinsing the surface to which the primer composition is to be applied. Acetone or a mixture of acetone with toluene or xylene is preferred as the solvent because of the rapid drying characteristics it imparts to the composition.

The order in which the ingredients of the primer composition are mixed is critical. It is essential that the phenyl-containing siloxane resin and the non-halogenated solvent be mixed together first. The alkylsilicate and chlorosilane can then be added in any order. If the phenyl-containing siloxane resin, the alkylsilicate and the chlorosilane are mixed together first a gel is formed in a matter of minutes.

The raw room temperature vulcanizing silicone rubbers which can be adhered to surfaces with the primer composition of this invention include any system except room temperature vulcanizing stocks employing the reaction of a silicon-bonded hydrogen and a silicon-bonded alkenyl group in the presence of a platinum catalyst. Also, room temperature vulcanizing stocks containing an alkylpolysilicate and a lead salt of a carboxylic acid will not give a permanent bond to the primer of this invention unless they are heat vulcanized. Any of the room temperature vulcanizing silicone rubbers which have been vulcanized and cured can be bonded to surfaces employing the primer of this invention and a suitable adhesive.

Illustrative of the room temperature vulcanizing silicone rubbers that can be adhered to surfaces, subject to the aforementioned limitations, are the following systems:

(1) The combination of an acid free diorganopolysiloxane; a silicate and a metal salt of a carboxylic acid such as those described in U.S. Patent No. 2,927,907.

(2) The combination of a diorganopolysiloxane containing silicon-bonded hydroxyl groups, Cellosolve silicates and metal salts of carboxylic acids such as those disclosed in U.S. Patent No. 2,902,467.

(3) The diacyloxy endblocked diorganopolysiloxanes such as those disclosed in U.S. Patent No. 3,035,016.

(4) The combination of from .01 to 5 percent by weight of an organohydrogenpolysiloxane, a diorganopolysiloxane containing at least two SiOH groups per molecule and a metal salt of a carboxylic acid as disclosed in U.S. Patent No. 3,061,567.

(5) The foam producing combination of a diorganopolysiloxane containing both silicon-bonded hydroxyl groups and silicon-bonded hydrogen atoms and a stannous salt of a carboxylic acid with or without additional hydroxylated compounds as shown in U.S. Patent No. 3,070,555.

(6) The combination of an acid free diorganopolysiloxane, an alkylpolysilicate, and a condensation product of an aldehyde and an amine such as those described in U.S. Patent No. 2,833,742.

(7) The combination of a polysiloxane containing silicon-bonded hydroxyl groups and a silane containing silicon-bonded oxime radicals such as described in U.S. Patent No. 3,189,576.

(8) The combination of a polysiloxane containing silicon-bonded hydroxyl groups, a silane containing silicon-bonded oxime radicals, a carboxylic acid anhydride and magnesium oxide such as described in U.S. Patent No. 3,184,427.

(9) The combination of a polysiloxane containing silicon-bonded hydroxyl groups, a silane containing silicon-an organotitanate or organosiloxytitanium catalyst such as disclosed in British Patent No. 972,900.

The procedure for bonding raw room temperature vulcanizing silicone rubbers to other surfaces is as follows: First, the surface to which the rubber is to be bonded is cleaned and degreased. Then the cleaned surface is rinsed with a non-halogenated solvent. This step is necessary only if a halogenated solvent or if a detergent cleaning agent was employed to clean the surface. Next a coating of the primer composition of this invention is applied to the surface and allowed to dry for at least 30 seconds. Finally, the catalyzed room temperature vulcanizing silicone rubber is applied to the primed surface and allowed to vulcanize.

The procedure for bonding vulcanized and cured silicone rubbers to other surfaces is the same as for the raw room temperature vulcanizing silicon rubbers through the priming step. However, after the primer has dried an adhesive composition is applied to the primed surface and then the silicone rubber is pressed onto the adhesive. Adhesives that can be used are, for example, any of the well known one-component room temperature vulcanizing silicone rubbers. Illustrative of the suitable adhesives are the materials disclosed in U.S. Patent No. 3,035,016, U.S. Patent No. 3,189,576 and British Patent No. 972,900 referred to hereinabove.

The disclosures of all patents referred to hereinabove are incorporated herein by reference.

The following examples are for the pupose of illustration only and should not be construed as limiting to the invention. All parts and percents are on a weight basis unless otherwise specified.

Example 1

A primer composition was made by first mixing 100 parts of a phenyl-containing siloxane resin consisting of 60 percent solids in toluene of a copolymer consisting of 29.3 mol percent $(CH_3)_2SiO$ units, 32.0 mol percent of $CH_3SiO_{3/2}$ units and 38.7 mol percent of $C_6H_5SiO_{3/2}$ units and 188 parts of acetone. Then 5.9 parts of ethylorthosilicate and 0.6 part of methyltrichlorosilane were added to the mixture.

The above primer was brushed onto glass, aluminum, stainless steel, copper and brass panels which had been cleaned with a chlorinated solvent and then rinsed with acetone. The primer was allowed to dry for about 30 minutes. Then six different catalyzed raw room temperature silicone rubbers were spread on the panels about an inch wide and ⅛ inch thick. The different room temperature vulcanizing rubbers are designated A, B, C, D, E and F in the following table which shows the bonding results.

Rubber A consisted essentially of 100 parts of a hydroxyl endblocked polydimethylsiloxane polymer having a viscosity at 25° C. of about 14,000 cs., 34 parts of diatomaceous earth, 3 parts of n-propylorthosilicate, 4 parts of a polydimethylsiloxane fluid having a viscosity at 25° C. of 12,500 cs. and 0.5 part of dibutyltindilaurate. Rubber B consisted essentially of 100 parts of a hydroxyl endblocked polydimethyl siloxane polymer having a viscosity at 25° C. of about 14,000 cs., 33 parts of diatomaceous earth, 3 parts of n-propylorthosilicate and 0.5 part of stannous octoate. Rubber C consisted essentially of 100 parts of a hydroxyl endblocked polydimethylsiloxane polymer having a viscosity at 25° C. of 10,000 cs., 34 parts of diatomaceous earth, 3 parts of ethylpolysilicate, 4 parts of a polydimethylsiloxane fluid having a viscosity at 25° C. of 12,500 cs. and 0.5 part of lead octoate. Rubber C is illustrative of the room temperature vulcanizing stocks which require heat vulcanizing to obtain good bonding. Rubber D consisted essentially of 100 parts of a hydroxyl endblocked polydimethylsiloxane polymer having a viscosity at 25° C. of about 2,000 cs., 26.3 parts of diatomaceous earth, 40 parts of zirconium silicate, 15 parts of zinc oxide, 4 parts of n-propylorthosilicate, 5.3 parts of a polydimethylsiloxane fluid having a viscosity at 25° C. of 12,500 cs. and 0.74 part of dibutyltindilaurate. Rubber E consisted essentially of 100 parts of a hydroxyl endblocked polydimethylsiloxane polymer having a viscosity at 25° C. of about 8,500 cs., 34 parts of diatomaceous earth, 5 parts of n-propylorthosilicate, 4 parts of a polydimethylsiloxane fluid having a viscosity at 25° C. of 12,500 cs. and 0.5 part of dibutyltindilaurate. Rubber F consisted essentially of 100 parts of a vinyldimethyl endblocked polydimethylsiloxane polymer having a viscosity at 25° C. of about 2,500 cs., 32.2 parts of diatomaceous earth, 25.4 parts of zirconium silicate, 1.1 parts of a trimethylsilyl endblocked polymethylhydrogensiloxane, 0.72 part of ferric oxide and 1 part of a platinum catalyst. Rubber F is illustrative of the room temperature vulcanizing stocks which cannot be bonded with the primer of this invention.

Bonding tests were run consecutively after 1, 3 and 7 days at room temperature; 8 hours at 300° F., 16 hours at 400° F. and 16 hours at 480° F.; and autoclaved at 50 p.s.i. for 2, 4, 6, 8 and 10 hours. The test planels were rated visually as excellent (E), good (G) or poor (P).

Example 2

The following variations of the primer composition of Example 1 were prepared:

(a) A primer was prepared by mixing 50 parts of the phenyl-containing siloxane resin, 238 parts of acetone, 5.9 parts of ethylorthosilicate and 0.6 part of methyltrichlorosilane.

(b) A primer was prepared by mixing 25 parts of the phenyl-containing siloxane resin, 263 parts of acetone, 5.9 parts of ethylorthosilicate and 0.6 part of methyltrichlorosilane.

(c) A primer was prepared by mixing 100 parts of the phenyl-containing siloxane resin, 190.9 parts of acetone, 3 parts of ethylorthosilicate and 0.6 part of methyltrichlorosilane.

(d) A primer was prepared by mixing 100 parts of the phenyl-containing siloxane resin, 192.4 parts of acetone, 1.5 parts of ethylorthosilicate and 0.6 part of methyltrichlorosilane.

(e) A primer was prepared by mixing 100 parts of the phenyl-containing siloxane resin, 188.3 parts of acetone, 5.9 parts of ethylorthosilicate and 0.3 part methyltrichlorosilane.

(f) A primer was prepared by mixing 100 parts of the phenyl-containing siloxane resin, 188.45 parts of acetone, 5.9 parts of ethylorthosilicate and 0.15 part of methyltrichlorosilane.

Each of the primer compositions was applied to a clean aluminum panel and allowed to air dry (about 15 minutes). A catalyzed room temperature vulcanizing rubber (type C) was applied to the panels and heat vulcanized. All of the primer compositions gave satisfactory bonding.

Example 3

Three primer compositions were prepared as in Example 1 with the exception that n-propylorthosilicate, cellosolveorthosilicate and ethylpolysilicate, respectively, were substituted for the ethylorthosilicate. Each of these primer compositions were applied to a clean aluminum panel and allowed to air dry at least 30 seconds. Then a catalyzed room temperature vulcanizing rubber was applied to the panels and allowed to vulcanize. All of these primer compositions gave excellent bonding.

Example 4

A primer composition was prepared by first mixing

BONDING RESULTS

| | Days at room temp. | | | 8 hours at 300° F. | 16 hours at 400° F. | 16 hours at 480° F. | Hours autoclaved at 50 p.s.i. | | | | |
|---|---|---|---|---|---|---|---|---|---|---|---|
| | 1 | 3 | 7 | | | | 2 | 4 | 6 | 8 | 10 |
| Glass: | | | | | | | | | | | |
| A | E | E | E | G | E | E | E | E | G | G | G |
| B | E | E | E | E | E | E | E | E | E | E | E |
| C | G | P | P | E | E | E | E | E | E | E | E |
| D | E | E | E | E | E | E | | | | | |
| E | E | E | E | E | E | E | E | E | E | E | E |
| F | P | P | P | P | P | P | P | P | P | P | P |
| Aluminum: | | | | | | | | | | | |
| A | E | E | E | E | E | E | E | E | E | E | E |
| B | E | E | E | E | E | E | E | E | E | E | E |
| C | G | P | P | E | E | E | E | E | E | E | E |
| D | E | E | E | E | E | E | E | E | E | E | E |
| E | E | E | E | E | E | E | E | E | E | E | E |
| F | P | P | P | P | P | P | P | P | P | P | P |
| Stainless steel: | | | | | | | | | | | |
| A | E | E | E | E | E | E | E | E | E | E | E |
| B | E | E | E | E | E | E | E | E | E | E | E |
| C | G | P | P | E | E | E | E | E | E | E | E |
| D | E | E | E | E | E | E | E | E | E | E | E |
| E | E | E | E | E | E | E | E | E | E | E | E |
| F | P | P | P | P | P | P | P | P | P | P | P |
| Copper: | | | | | | | | | | | |
| A | E | E | | | | | G | G | G | G | G |
| B | E | E | E | | | | | | | | |
| C | G | P | P | | | | | | | | |
| D | E | E | E | E | E | | E | E | E | E | E |
| E | E | E | | E | E | E | E | E | E | E | E |
| F | P | P | P | P | P | P | P | P | P | P | P |
| Brass: | | | | | | | | | | | |
| A | E | E | E | E | E | E | E | E | E | E | E |
| B | E | E | | | | | | | | | |
| C | E | E | E | E | E | E | E | E | E | E | E |
| D | E | E | E | E | E | E | E | E | E | E | E |
| E | E | E | E | E | E | E | E | E | E | E | E |
| F | P | P | P | P | P | P | P | P | P | P | P |

100 parts of a phenyl-containing siloxane resin consisting of 60 percent solids in toluene of a copolymer consisting of 29.4 mol. percent of $(C_6H_5)(CH_3)SiO$ units, 32.0 mol percent of $CH_3SiO_{3/2}$ units, 32.6 mol percent of $C_6H_5SiO_{3/2}$ units and 6.0 mol percent of $(C_6H_5)_2SiO$ units and 188 parts of acetone. Then 5.9 parts of ethylorthosilicate and 0.6 part of methyltrichlorosilane were added to the mixture.

This primer composition was found to give bonding equivalent to that of the primer of Example 1 upon testing.

Example 5

A primer composition was made by first mixing 100 parts of a phenyl-containing siloxane resin consisting of 50 percent solids in xylene of a copolymer consisting of 31.4 mol percent of $(CH_3)(C_6H_5)SiO$ units, 34.0 mol percent of $CH_3SiO_{3/2}$ units and 34.6 mol percent of $C_6H_5SiO_{3/2}$ units and 188 parts of acetone. Then 5.9 parts of ethylorthosilicate and 0.6 part of methyltrichlorosilane were added to the mixture.

Upon testing, this primer composition was found to give bonding equivalent to that of the primer of Example 1.

Example 6

A primer composition was prepared as in Example 1 except that 1,1,1-trichloroethane was substituted for the acetone. No satisfactory bonding could be obtained employing this primer composition containing a halogenated solvent.

Example 7

When the following phenyl-containing siloxane resins which are copolymers consisting of the specified phenyl and methylsiloxane units are substituted for the resin of Example 1, good primer compositions are obtained.

(a) 25 mol percent of $CH_3SiO_{3/2}$ units, 35 mol percent of $C_6H_5SiO_{3/2}$ units, 20 mol percent of $(CH_3)_2SiO$ units and 20 mol percent of $(C_6H_5)_2SiO$ units.

(b) 62 mol percent of $CH_3SiO_{3/2}$ units, 29 mol percent of $C_6H_5SiO_{3/2}$ units and 9 mol percent of $(C_6H_5)_2SiO$ units and 9 mol percent of $(C_6H_5)_2SiO$ units.

(c) 38 mol percent of $(CH_3)_2SiO$ units, 9 mol percent of $(C_6H_5)(CH_3)SiO$ units, 21 mol percent of $CH_3SiO_{3/2}$ units and 32 mol percent of $C_6H_5SiO_{3/2}$ units.

(d) 47 mol percent of $(C_6H_5)(CH_3)SiO$ units, 25 mol percent of $CH_3SiO_{3/2}$ units, 20 mol percent of $C_6H_5SiO_{3/2}$ units, and 8 mol percent of $(C_6H_5)_2SiO$ units.

(e) 55 mol percent of $(CH_3)(C_6H_5)SiO$ units, 30 mol percent of $CH_3SiO_{3/2}$ units and 15 mol percent of $C_6H_5SiO_{3/2}$ units.

(f) 65 mol percent of $CH_3SiO_{3/2}$ units and 35 mol percent of $C_6H_5SiO_{3/2}$ units.

(g) 35 mol percent of $(CH_3)(C_6H_5)SiO$ units, 10 mol percent of $(CH_3)_2SiO$ units, 25 mol percent of $CH_3SiO_{3/2}$ units and 30 mol percent of $C_6H_5SiO_{3/2}$ units.

(h) 50 mol percent of $C_6H_5SiO_{3/2}$ units, 35 mol percent of $(CH_3)_2SiO$ units and 15 mol percent of $(C_6H_5)(CH_3)SiO$ units.

(i) 35 mol percent of $C_6H_5SiO_{3/2}$ units, 29 mol percent of $CH_3SiO_{3/2}$ units, 26.5 mol percent of $(CH_3)_2SiO$ units and 9.5 mol percent of $(C_6H_5)_2SiO$ units.

Example 8

When a primer composition was prepared by first mixing 50 parts of a phenyl-containing siloxane resin consisting of 47 mol percent of $(C_6H_5)(CH_3)SiO$ units, 25 mol percent of $CH_3SiO_{3/2}$ units, 20 mol percent of $C_6H_5SiO_{3/2}$ units and 8 mol percent of $(C_6H_5)_2SiO$ units and 240 parts of xylene and then adding 6.5 parts of ethylorthosilicate and 0.5 part of dimethyldichlorosilane, good bonding of room temperature vulcanizing rubbers was obtained with the resultant composition.

Example 9

When the following chlorosilanes are substituted for the methyltrichlorosilane of Example 1, good primer compositions are obtained:

(a) trimethylchlorosilane
(b) ethyltrichlorosilane
(c) isopropyltrichlorosilane
(d) methylphenyldichlorosilane
(e) octadecyltrichlorosilane
(f) methylvinyldichlorosilane
(g) diheptyldichlorosilane Example 10

When a primer composition was prepared by first mixing 100 parts of a phenyl-containing siloxane resin consisting of 62 mol percent of $CH_3SiO_{3/2}$ units, 29 mol percent of $C_6H_5SiO_{3/2}$ units and 9 mol percent of $(C_6H_5)_2SiO$ units and 85 parts of acetone and then adding 12.5 parts of ethylorthosilicate and 2.5 parts of methyltrichlorosilane, good bonding was obtained with the resulting primer composition.

That which is claimed is:

1. A method for bonding raw room temperature vulcanizing silicone rubbers to other surfaces comprising the steps of
   (1) applying to the clean surface a coating of a composition consisting essentially of 1 to 75 percent by weight of a phenyl-containing siloxane resin which is a copolymer that consists essentially of phenyl and methylsiloxane units and has a phenyl to silicon ratio in the range of .1:1 to 1:1, a methyl to silicon ratio in the range of .6:1 to 1.1:1 and the total of the phenyl and methyl to silicon ratio being in the range of .8:1 to 1.8:1, 0.1 to 10 percent by weight of an alkylsilicate, 0.01 to 2 percent by weight of a chlorosilane and the balance being a non-halogenated solvent,
   (2) allowing the coating to dry for at least 30 seconds,
   (3) applying a catalyzed room temperature vulcanizing silicone rubber to the coated surface, and
   (4) allowing the rubber to vulcanize.

2. The method of claim 1 wherein in the composition the phenyl-containing siloxane resin is a copolymer that consists of phenyl and methylsiloxane units selected from the group consisting of the $CH_3SiO_{3/2}$, $(CH_3)_2SiO$, $(CH_3)(C_6H_5)SiO$, $C_6H_5SiO_{3/2}$ and $(C_6H_5)_2SiO$ siloxane units.

3. The method of claim 1 wherein the composition consists essentially of 10 to 60 percent by weight of a phenyl-containing siloxane resin which is a copolymer that consists essentially of phenyl and methylsiloxane units and has a phenyl to silicon ratio in the range of .3:1 to .8:1, a methyl to silicon ratio in the range of .6:1 to 1.1:1 and the total of the phenyl and methyl to silicon ratio being in the range of .9:1 to 1.7:1, 0.5 to 5 percent by weight of an alkylsilicate, 0.05 to 1 percent by weight of a chlorosilane and the balance being a non-halogenated solvent.

4. The method of claim 3 wherein in the composition the phenyl-containing siloxane resin is a copolymer that consists of phenyl and methylsiloxane units selected from the group consisting of the $CH_3SiO_{3/2}$, $(CH_3)_2SiO$, $(CH_3)(C_6H_5)SiO$, $C_6H_5SiO_{3/2}$ and $(C_6H_5)_2SiO$ siloxane units.

5. The method of claim 1 wherein the composition consists essentially of 15 to 25 percent by weight of a phenyl-containing siloxane resin which is a copolymer consisting essentially of 25 to 35 mol percent of $(CH_3)_2SiO$ units, 27 to 37 mol percent of $CH_3SiO_{3/2}$ units and 34 to 44 mol percent of $C_6H_5SiO_{3/2}$ units, 1 to 3 percent by weight of ethylorthosilicate, 0.1 to 0.3 percent by weight of methyltrichlorosilane, 10 to 17 percent by weight of toluene and 50 to 75 percent by weight of acetone.

6. A method for bonding vulcanized and cured silicone rubbers to other surfaces comprising the steps of
  (1) applying to the clean surface a coating of a composition consisting essentially of 1 to 75 percent by weight of a phenyl-containing siloxane resin which is a copolymer that consists essentially of phenyl and methylsiloxane units and has a phenyl to silicon ratio in the range of .1:1 to 1:1, a methyl to silicon ratio in the range of .6:1 to 1.1:1 and the total of the phenyl and methyl to silicon ratio being in the range of .8:1 to 1.8:1, 0.1 to 10 percent by weight of an alkylsilicate, 0.01 to 2 percent by weight of a chlorosilane and the balance being a non-halogenated solvent,
  (2) allowing the coating to dry for at least 30 seconds,
  (3) applying an adhesive composition consisting essentially of a one-component room temperature vulcanizing silicone rubber to the coated surface, and
  (4) pressing the silicone rubber to be bonded onto the adhesive.

7. The method of claim 6 wherein in the composition the phenyl-containing siloxane resin is a copolymer that consists of phenyl and methylsiloxane units selected from the group consisting of the $CH_3SiO_{3/2}$, $(CH_3)_2SiO$, $(CH_3)(C_6H_5)SiO$, $C_6H_5SiO_{3/2}$ and $(C_6H_5)_2SiO$ siloxane units.

8. The method of claim 6 wherein the composition consists essentially of 10 to 60 percent by weight of a phenyl-containing siloxane resin which is a copolymer that consists essentially of phenyl and methylsiloxane units and has a phenyl to silicon ratio in the range of .3:1 to .8:1, a methyl to silicon ratio in the range of .6:1 to 1.1:1 and the total of the phenyl and methyl to silicon ratio being in the range of .9:1 to 1.7:1, 0.5 to 5 percent by weight of an alkylsilicate, 0.05 to 1 percent by weight of a chlorosilane and the balance being a non-halogenated solvent.

9. The method of claim 8 wherein in the composition the phenyl-containing siloxane resin is a copolymer that consists of phenyl and methylsiloxane units selected from the group consisting of the $CH_3SiO_{3/2}$, $(CH_3)_2SiO$, $(CH_3)(C_6H_5)SiO$, $C_6H_5SiO_{3/2}$ and $(C_6H_5)_2SiO$ siloxane units.

10. The method of claim 6 wherein the composition consists essentially of 15 to 25 percent by weight of a phenyl-containing siloxane resin which is a copolymer consisting essentially of 25 to 35 mol percent of $(CH_3)_2SiO$ units, 27 to 37 mol percent of $CH_3SiO_{3/2}$ units and 34 to 44 mol percent of $C_6H_5SiO_{3/2}$ units, 1 to 3 percent by weight of ethylorthosilicate, 0.1 to 0.3 percent by weight of methyltrichlorosilane, 10 to 17 percent by weight of toluene and 50 to 75 percent by weight of acetone.

References Cited

UNITED STATES PATENTS

| | | | |
|---|---|---|---|
| 2,643,964 | 6/1953 | Smith-Johannsen | 161—206 XR |
| 2,652,385 | 9/1953 | Hunter et al. | 260—46.5 |
| 2,751,314 | 6/1956 | Keil | 117—72 |

EARL M. BERGERT, Primary Examiner

D. F. FRITSCH, Assistant Examiner

U.S. Cl. X.R.

156—329; 161—206, 207